(12) United States Patent
Amarilio et al.

(10) Patent No.: US 11,487,495 B2
(45) Date of Patent: Nov. 1, 2022

(54) AUDIO FLOW FOR INTERNET OF THINGS (IOT) DEVICES DURING POWER MODE TRANSITIONS

(71) Applicant: QUALCOMM Incorporated, San Diego, CA (US)

(72) Inventors: Lior Amarilio, Yokneam (IL); Nileena Pathalayi Alakandy, Bangalore (IN); Syed Naseef, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 17/174,488

(22) Filed: Feb. 12, 2021

(65) Prior Publication Data
US 2022/0261207 A1   Aug. 18, 2022

(51) Int. Cl.
| G06F 3/16 | (2006.01) |
| G06F 13/42 | (2006.01) |
| H04R 5/04 | (2006.01) |
| G06F 13/24 | (2006.01) |
| G06F 1/12 | (2006.01) |
| H04W 52/02 | (2009.01) |
| H04R 3/12 | (2006.01) |

(52) U.S. Cl.
CPC ................ *G06F 3/162* (2013.01); *G06F 1/12* (2013.01); *G06F 13/24* (2013.01); *G06F 13/4291* (2013.01); *H04R 5/04* (2013.01); *H04W 52/0229* (2013.01); *H04R 3/12* (2013.01)

(58) Field of Classification Search
CPC . G06F 3/162; G06F 1/12; G06F 13/24; G06F 13/4291; H04R 5/04; H04R 3/12; H04W 52/0229
See application file for complete search history.

(56) References Cited

U.S. PATENT DOCUMENTS

2013/0322462 A1* 12/2013 Poulsen .................... H04L 7/10
                                                                     370/458
2017/0154620 A1*  6/2017 Berthelsen .............. G10L 15/16

* cited by examiner

*Primary Examiner* — Joseph Saunders, Jr.
(74) *Attorney, Agent, or Firm* — Qualcomm Incorporated

(57) ABSTRACT

Systems and methods for essentially continuous audio flow for Internet of Things (IoT) devices during power mode transitions contemplate an audio bus, such as a SOUND-WIRE audio bus, to maintain an audio stream during a clock transition without having to tear down the audio stream as a new clock becomes active on the audio bus. By preserving the audio stream during such a transition, gaps in the audio are avoided resulting in better performance and end user experience.

26 Claims, 9 Drawing Sheets

AUDIO FLOW FOR INTERNET OF THINGS (IOT) DEVICES DURING POWER MODE TRANSITIONS

BACKGROUND

I. Field of the Disclosure

The technology of the disclosure relates generally to clock changes for audio signaling across an audio bus.

II. Background

Computing devices abound in modern society. The type and functionality of computing devices continues to evolve. For example, mobile computing devices such as laptop computers have evolved from relatively large cumbersome devices to sleek light weight devices and even merged with cellular phones to form smart phones and tablets. More recently, mobile computing devices have evolved into devices sometimes generically referred to as wearables, such as smart watches, smart glasses, and the like. Wearables are sometimes considered a subset of the Internet of Things (IoT) in that these devices can send and receive data, and may be used to access the Internet, or use the Internet for data access. Many wearables are voice activated and thus may include at least rudimentary audio processing functions. Audio processing and its associated functions seemingly always have room for improvement.

SUMMARY OF THE DISCLOSURE

Aspects disclosed in the detailed description include systems and methods for essentially continuous audio flow for Internet of Things (IoT) devices during power mode transitions. In particular, a wearable device or other IoT device may generally reside in a low-power or sleep mode but keep an "always on" circuit that detects audible cues (sometimes referred to as a "hotword") which cause the wearable device to transition to an active mode. In many cases, this may cause a transition between a low-frequency, low-power local clock and a higher-frequency clock that consumes relatively more power. Exemplary aspects of the present disclosure allow an audio bus, such as a SOUND-WIRE audio bus, to maintain an audio stream during such a clock transition without having to tear down the audio stream as the new clock becomes active on the audio bus. By preserving the audio stream during such a transition, gaps in the audio are avoided resulting in better performance and end user experience.

In this regard in one aspect, an integrated circuit (IC) is disclosed. The IC includes a first clock source. The IC also includes a clock input coupled to a second clock source. The IC also includes a switch coupled to the first clock source and the clock input. The IC also includes an audio master core. The audio master core includes an audio bus interface coupled to an audio bus. The audio master core also includes a control circuit coupled to the audio bus interface. The control circuit is configured to, while in a sleep mode, instruct the switch to select the first clock source to use on the audio bus for an audio stream. The control circuit is also configured to receive a command to exit the sleep mode. The control circuit is also configured to populate a reserve bank in a slave device with new audio stream parameters. The control circuit is also configured to exit the sleep mode. The control circuit is also configured to instruct the slave device to switch to the reserve bank without interrupting the audio stream.

In another aspect, an IoT device is disclosed. The IoT device includes an audio source including a microphone. The IoT device also includes an audio bus coupled to the microphone. The IoT device also includes an IC. The IC includes a first clock source. The IC also includes a clock input coupled to a second clock source. The IC also includes a switch coupled to the first clock source and the clock input. The IC also includes an audio master core. The audio master core includes an audio bus interface coupled to the audio bus. The audio master core also includes a control circuit coupled to the audio bus interface. The control circuit is configured to, while in a sleep mode, instruct the switch to select the first clock source to use on the audio bus for an audio stream. The control circuit is also configured to receive an audio hotword command from the audio source to exit the sleep mode. The control circuit is also configured to populate a reserve bank in the audio source with new audio stream parameters. The control circuit is also configured to exit the sleep mode. The control circuit is also configured to instruct the audio source to switch to the reserve bank without interrupting the audio stream.

DETAILED DESCRIPTION

Figure 1:
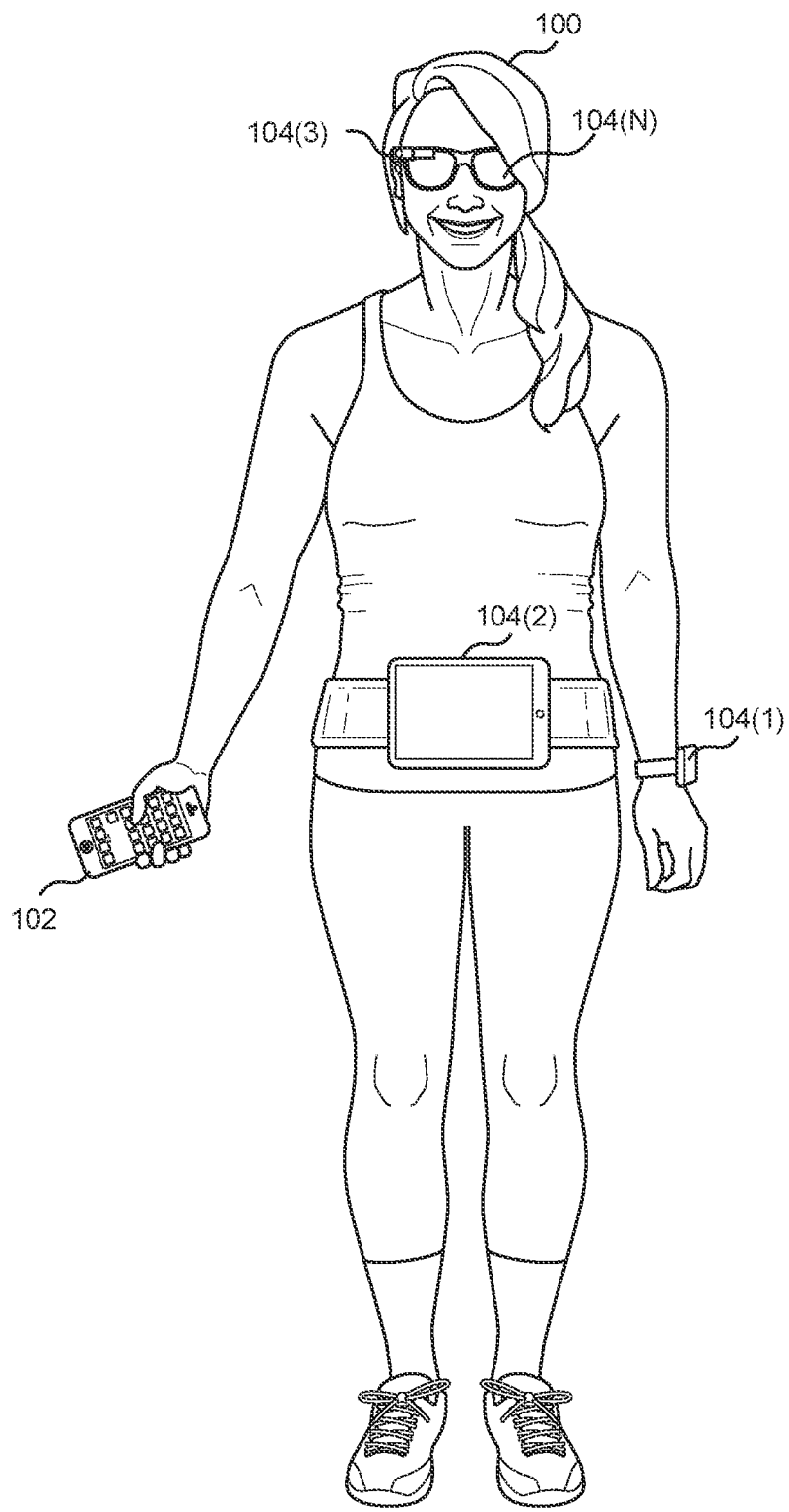
FIG. 1 illustrates a person wearing a variety of wearable Internet of Things (IoT) devices that may be coupled to a cellular network directly or through a mobile computing device such as a smart phone carried by the person.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for essentially continuous audio flow for Internet of Things (IoT) devices during power mode transitions. In particular, a wearable device or other IoT device may generally reside in a low-power or sleep mode but keep an "always on" circuit that detects audible cues (sometimes referred to as a "hotword") which cause the wearable device to transition to an active mode. In many cases, this may cause a transition between a low-frequency, low-power local clock and a higher-frequency clock that consumes relatively more power. Exemplary aspects of the present disclosure allow an audio bus, such as a SOUNDWIRE audio bus, to maintain an audio stream during such a clock transition without having to tear down the audio stream as the new clock becomes active on the audio bus. By preserving the audio stream during such a transition, gaps in the audio are avoided resulting in better performance and end user experience.

Before addressing exemplary aspects of the present disclosure, an overview of IoT devices and how they transition from a low-power or sleep mode to an active mode is provided with reference to FIGS. 1-4. The problem of typical transitions is illustrated with reference to FIGS. 5A and 5B, with a discussion of a solution to audio stream interruption during clock changes that occur as the IoT device transitions from a low-power or sleep mode to an active mode beginning below with reference to FIG. 6. While the present disclosure is well suited for IoT device transitions, the teachings of the present disclosure may be applicable to other devices that employ an audio bus that transitions between clocks.

In this regard, FIG. 1 illustrates a person 100 having a mobile computing device 102 (e.g., a smart phone, tablet, or the like) that may act as a host device for one or more IoT devices 104(1)-104(N). As used herein, an "IoT device" is a device that has embedded sensors, software, and other technologies for the purpose of connecting and exchanging data with other devices and systems over the Internet. Returning to FIG. 1, as illustrated, N=3, where IoT device 104(1) is a smart watch, IoT device 104(2) is a smart belt buckle, and IoT device 104(3) is a pair of smart glasses. Note that in this example, the left and right side of the "pair" of glasses belong to the same IoT device, although it is possible that if these were distinct devices, N could be 4. These IoT devices 104(1)-104(N) are intended to be exemplary and not limiting. Other wearable IoT devices (not illustrated) may also work with the present disclosure. Likewise, other general IoT devices (not necessarily a wearable IoT device) may benefit from the present disclosure and may (or may not) use a mobile computing device 102 as a host device.

Figure 2A:
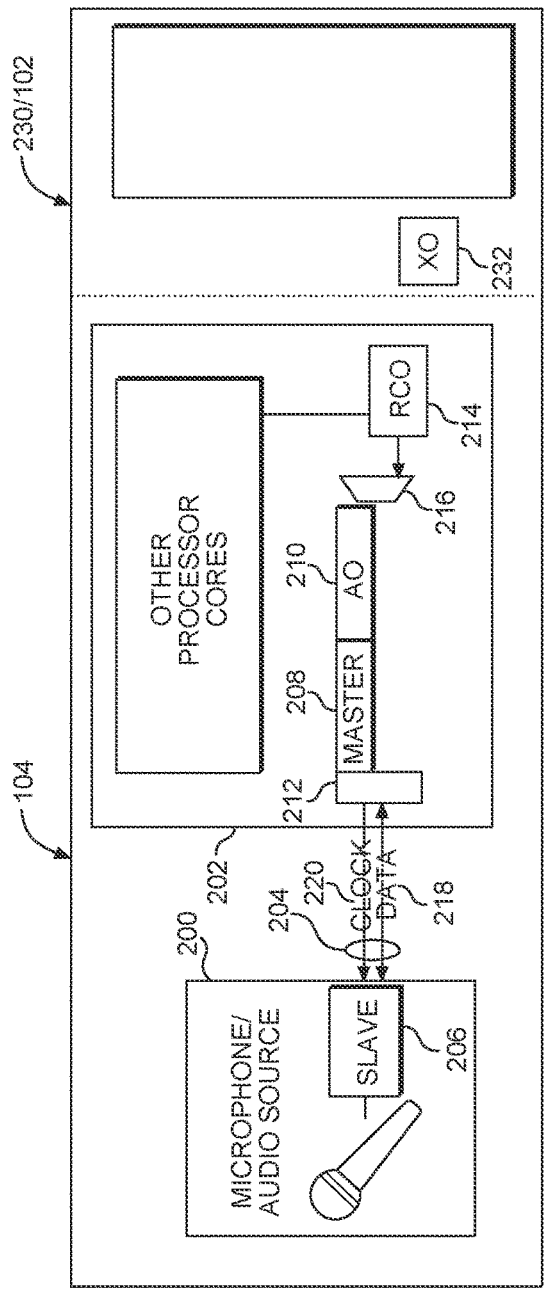
FIG. 2A is a block diagram of circuitry within an IoT device communicating with a host during a low-power mode using a first clock source.
Figure 2B:
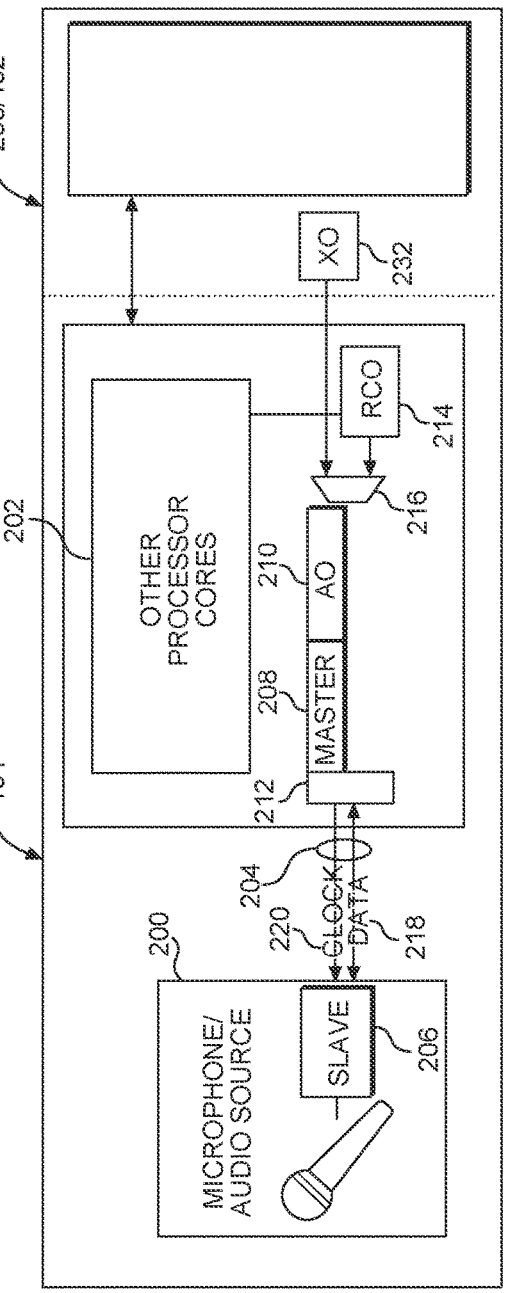
FIG. 2B is a block diagram of the circuitry within the IoT device communicating with a host during an active mode using a second clock source.

Wearable IoT devices, such as an IoT device 104, illustrated in FIGS. 2A and 2B, which may be any of the IoT devices 104(1)-104(N), are typically battery powered. To extend time between battery recharging, many such devices operate for extended periods in a sleep or low-power mode where some (perhaps even most) functions are dormant and power consumption is close to nil. When the IoT device 104 receives an activation command, the IoT device 104 transitions to an active mode where most functions are active and consuming power to provide desired functionality to an end user. FIG. 2A illustrates a low-power mode for the IoT device 104 while FIG. 2B illustrates an active power mode for the IoT device 104.

In particular, the IoT device 104 may include an audio source 200 coupled to an integrated circuit (IC) 202 by an audio bus 204. In an exemplary aspect, the audio source 200 may be one or more microphones, and more particularly may be a SOUNDWIRE microphone(s) or an analog microphone(s) with circuitry 206 that enables operation with a SOUNDWIRE audio bus. That is, the circuitry 206 may include an audio bus interface that is configured to couple to the audio bus 204 as well as (if needed) an analog-to-digital converter (ADC) that takes an analog signal captured by the transducer (not shown) of the microphone and converts the analog signal to a digital signal suitable for use on the audio bus 204. In most instances, the audio source 200 acts as a slave relative to the IC 202, and thus, the audio bus interface may be referred to as a slave audio bus interface and the circuitry 206 may be slave circuitry.

The IC 202 may act as a control circuit for the IoT device 104 and may include an application processor core, a BLUETOOTH core capable of wireless transmission according to the BLUETOOTH standard, a WIFI core capable of wireless transmission according to the WIFI standard, and the like including the simplest of cases where the core includes a communication circuit configured to communicate over a wire (not shown) to an IC that may include such communication capabilities (e.g., the mobile computing device 102) (generically shown as "other processing cores" in FIGS. 2A and 2B). The IC 202 may further include a master audio circuit 208, which may have an always on (AO) circuit 210 and an interface 212 configured to couple to the audio bus 204. The IC 202 may further include an internal clock source 214, which may, in an exemplary aspect be a ring controlled oscillator (sometimes referred to as an RCO) that provides a relatively low-power clock signal at, for example, 4.8 megahertz (MHz). The internal clock source 214 may be coupled to a multiplexer or switch 216. The multiplexer or switch 216 may also receive a signal from an external clock (e.g., from a host 230 such as the mobile computing device 102) and select from between the two clock signals. In a low-power mode, the internal clock source 214 may be selected. When received, the clock signal from the external clock may also be shared with other processing cores of the IoT device 104.

The audio bus 204 may be a two-wire bus including a data line 218 and a clock line 220 and more particularly may be a SOUNDWIRE audio bus making any audio bus interface a SOUNDWIRE audio bus interface. The data line 218 may carry an audio stream from the audio source 200 at a constant rate (e.g., 600 kilohertz (kHz)). In the low-power or sleep mode, the clock line 220 carries a clock signal from the internal clock source 214.

As noted, the IC 202 may include a BLUETOOTH core (not specifically shown) or a WIFI core (also not specifically shown) which may communicate wirelessly to a host 230 such as the mobile computing device 102. The host 230 may include a clock source 232, which may, in an exemplary aspect, be a crystal oscillator (XO) and may operate at a higher frequency such as 9.6 or 19.2 MHz. Again, these values are exemplary and other values may be used without departing from the present disclosure. The clock signal from the clock source 232 may also be more stable than the clock signal from the internal clock source 214. The host 230 may include a modem, a BLUETOOTH core, a WIFI core, and the like to enable communication with the IoT device 104 and/or other networks (e.g., a cellular network or the like, not shown). When the IoT device 104 is in a sleep or low-power mode, the IoT device 104 may not communicate with the host 230 and thus does not receive the clock signal from the clock source 232. If the host 230 is also in a low-power mode, the clock source 232 may be turned off although the behavior of the clock source 232 is not central to the present disclosure.

While many IoT devices rely on an intermediate host such as the mobile computing device 102 to provide cellular data service, some IoT devices 104 may integrate the host 230 into the IoT device itself with a wirebased connection between the host 230 and the IC 202. Thus, for example, a smart watch may include a host 230 with the clock source 232 inside the watch reducing or eliminating the need for a wireless connection between the IC 202 and the host 230.

The IoT device 104 may transition to an active mode and use the clock source 232 as the clock source for the audio bus 204 as better seen in FIG. 2B. The audio stream may continue to be provided from the audio source 200 at 600 kHz. The IoT device 104 transitions from the sleep or low-power mode to the active mode through one of a variety of cues or actions. A user may tap, press a button, or otherwise interact with the IoT device 104 using a digit (e.g., a finger) causing the IoT device 104 to transition. Alternatively, the user may verbalize an audio cue or hotword that is detected by the AO circuit 210 and causes the transition. Audio hotwords are well known in the industry. Contemporary examples are "Alexa" for the AMAZON ECHO, "Hey Google" for the GOOGLE MINI NEST (and comparable devices), "SIRI" for the APPLE IOS, and the like. As used herein an audio hotword is a string of one or more phonemes for which a device is programmed to generate a specific response. In this case, the audio hotword causes the IoT device to wake and accept subsequent phonemes as a command. Thus, as is understood in the examples provided above, each of the audio hotwords causes the device to wake and accept subsequent words as a command to perform. For example, "Alexa, tell me a joke."

Figure 2C:
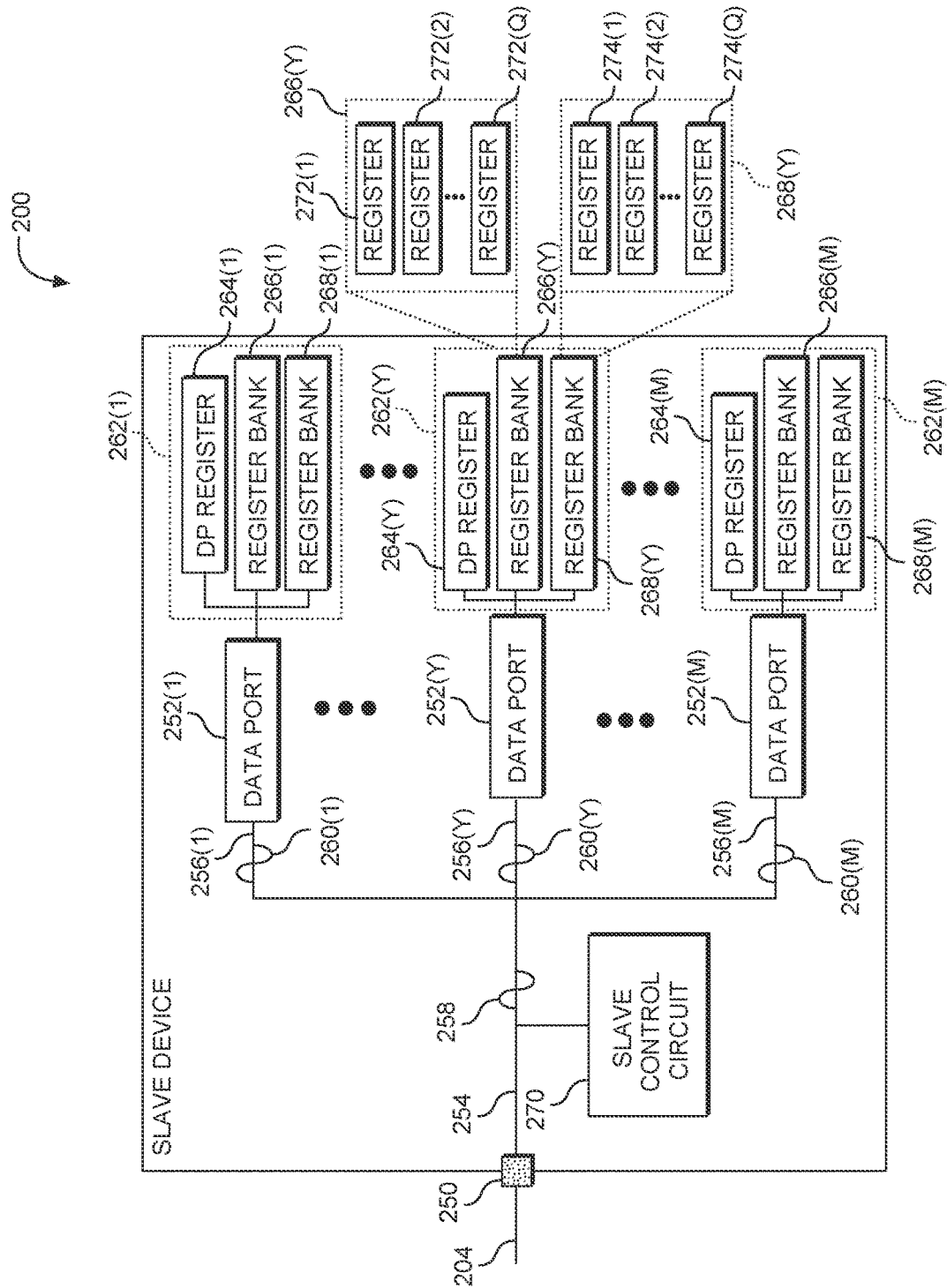
FIG. 2C is a block diagram of an audio slave such as a microphone that may be used in the IoT device of FIG. 2A or 2B.

While not central to the present disclosure, a discussion of a SOUNDWIRE slave, which may be the audio source 200 of FIG. 2A is provided with reference to FIG. 2C. The audio source 200 may include an audio bus interface 250 coupled to the audio bus 204. The data signal portion of signals received at the audio bus interface 250 is provided to a plurality of data ports 252(1)-252(M) via an internal bus 254. The plurality of data ports 252(1)-252(M) corresponds to a plurality of respective SOUNDWIRE channels 256(1)-256(M). In a non-limiting example, the plurality of SOUNDWIRE channels 256(1)-256(M) may be audio channels. The data signal is de-multiplexed to generate a control signal 258 and a plurality of respective SOUNDWIRE payload streams 260(1)-260(M) that correspond to the plurality of data ports 252(1)-252(M). In this regard, the plurality of data ports 252(1)-252(M) may be a sink of the plurality of SOUNDWIRE payload streams 260(1)-260(M).

With continuing reference to FIG. 2C, the plurality of data ports 252(1)-252(M) is controlled by a plurality of respective register sets 262(1)-262(M). In a non-limiting example, according to the SOUNDWIRE specification, each of the plurality of register sets 262(1)-262(M) has a register address space of 256 bytes. The plurality of register sets 262(1)-262(M) is divided into a plurality of respective data port (DP) registers 264(1)-264(M) (sometimes referred to as Non-Banked Registers), a plurality of first register banks 266(1)-266(M), and a plurality of respective second register banks 268(1)-268(M). For the convenience of reference and illustration, data port 252(Y) is discussed herein as a non-limiting example.

With continuing reference to FIG. 2C, register set 262(Y) controls payload transports to the data port 252(Y). Specifically, DP register 264(Y) contains static configurations to the data port 252(Y) that are typically unchanged while the data port 252(Y) is receiving SOUNDWIRE payload stream 260(Y). In contrast, dynamic configurations of the data port 252(Y), which may be changed while receiving the SOUNDWIRE payload stream 260(Y), are duplicated in first register bank 266(Y) and second register bank 268(Y) to facilitate seamless operational changes in the data port 252(Y). In this regard, at any given time, one register bank (e.g., the first register bank 266(Y)) is selected by a control circuit 270 of the slave control port (SCP) to function as an active register bank to control operations (present operation) of the data port 252(Y) while the other register bank (e.g., the second register bank 268(Y)) serves as a passive or reserve register bank and stays offline. The first register bank 266(Y) and the second register bank 268(Y) of the data port 252(Y) comprise a plurality of first registers 272(1)-272(Q) and a plurality of second registers 274(1)-274(Q) respectively.

When the master device (e.g., IC 202) needs to reconfigure the data port 252(Y) for a future operation that is different from the present operation of the data port 252(Y), the control system 270 duplicates the dynamic configuration of the data port 252(Y) from the active register bank (e.g., the first register bank 266(Y)) to the passive or reserve register bank (e.g., the second register bank 268(Y)) and then makes necessary updates in the passive or reserve register bank. Once the updates are made in the passive or reserve register bank, on receipt of a bank switch (sometimes referred to as bank select) command from the master, the control circuit 270 inverts the passive or reserve register bank and the active register bank to bring the passive register bank, which contains the updated dynamic configurations of the data port 252(Y), online to control the future operation of the data port 252(Y). As a result, the second register bank 268(Y) becomes the active register bank and the first register bank 266(Y) becomes the passive register bank and is offline.

Figure 3:
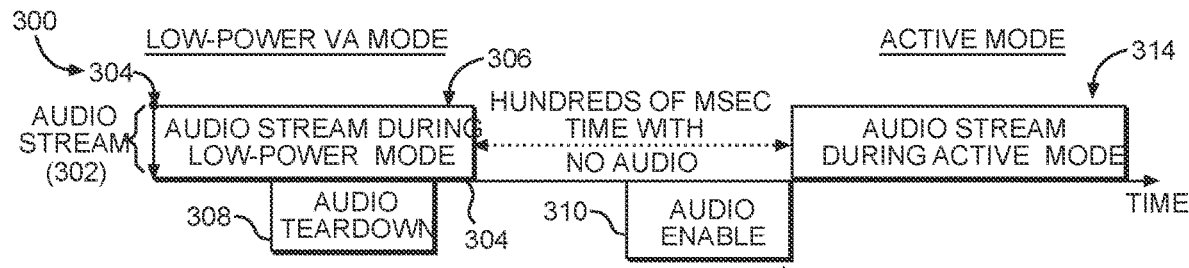
FIG. 3 illustrates an audio stream received by the IoT device as it switches from the low-power mode to the active mode in the absence of the present disclosure.
Figure 4:
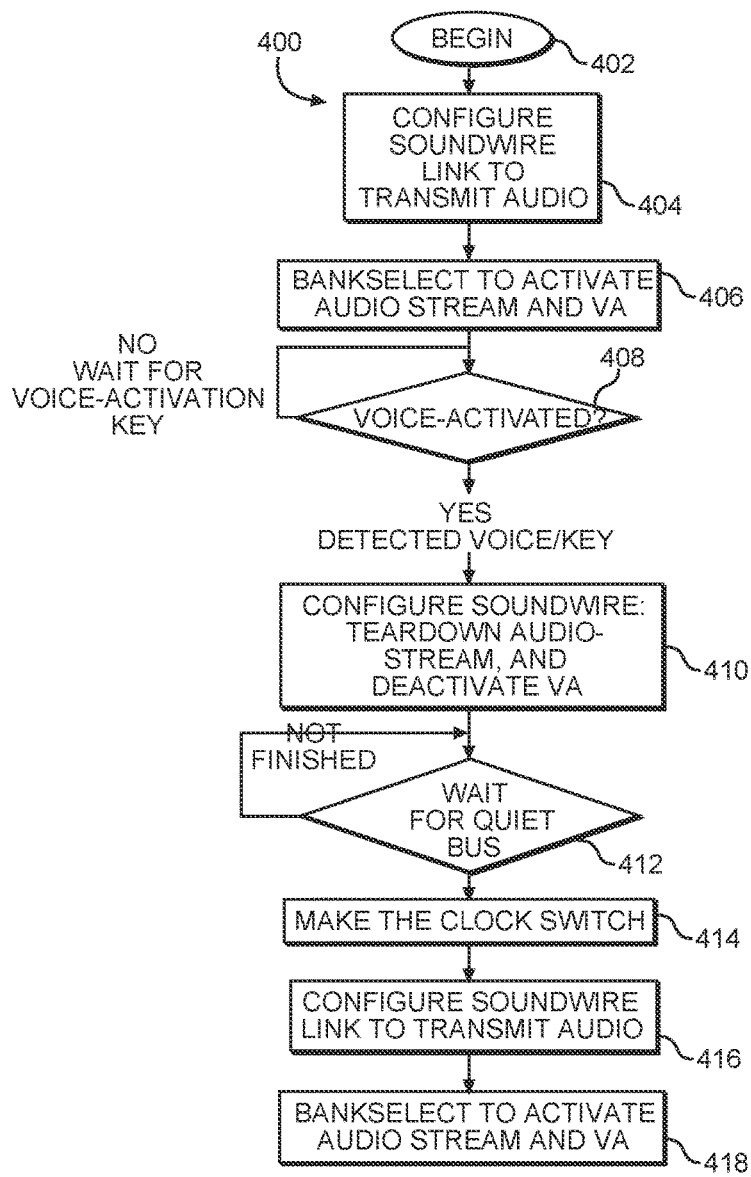
FIG. 4 is a flowchart of a process used by the IoT device as it switches clock sources as illustrated in FIGS. 2A and 2B in the absence of the present disclosure where the audio stream is torn down and rebuilt.
Figure 5A:
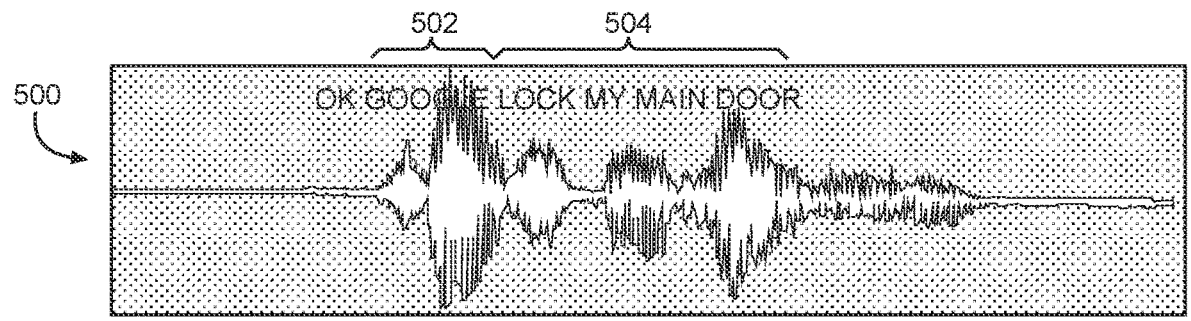
FIG. 5A is an exemplary voice waveform used to activate an IoT device from a low-power mode using an audio hotword.
Figure 5B:
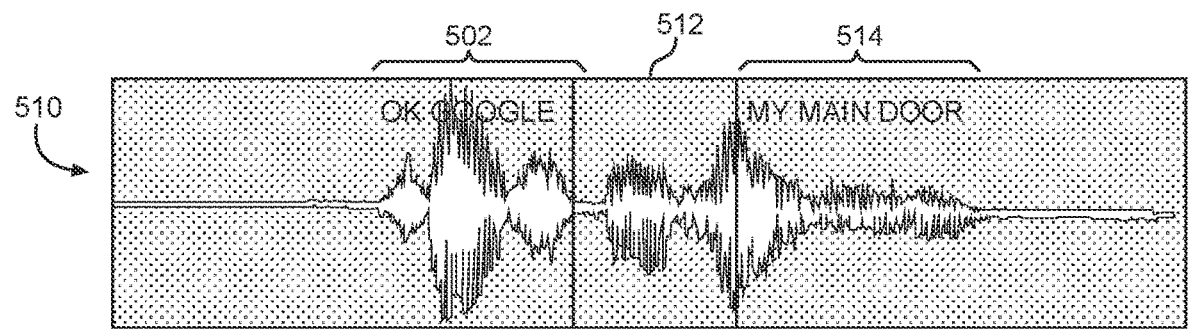
FIG. 5B illustrates what happens to the voice waveform when there is an interruption in the audio stream caused by clock changes as the IoT device transitions from a low-power mode to an active mode in the absence of the present disclosure.

Even with the use of bank switch commands, switching from the clock source 214 to the clock source 232 is a non-trivial exercise for a SOUNDWIRE audio bus. In particular, the initial low-power mode format (e.g., data port, frame size and configuration, clock division, and the like) is torn down and a new format is initialized. After initialization, the active mode begins. Between this time, the audio stream is not being received across the audio bus 204. This discontinuity of the audio stream may result in the loss of audio data from the user. FIGS. 3-5 highlight this issue. FIG. 3 shows a graph 300 of an audio stream 302 versus time. Initially, at time 304, there is an audio stream segment 306 during a low-power voice activated (VA) mode. This segment 306 may include an audio hotword and may end at time 304'. On receipt of the audio hotword, the control circuit (e.g., the master audio circuit 208) may initiate an audio tear down 308 and begin an audio enable 310. At time 312, a subsequent audio stream segment 314 is received while the IC 202 is in an active mode. Between time 304' and time 312, there may be hundreds of milliseconds elapsing with no audio stream received.

A process 400 associated with the audio tear down 308 and the audio enable 310 is better illustrated in FIG. 4. The process 400 begins (block 402). The IC 202 configures the audio bus 204 to transmit audio (block 404). The IC 202 may issue a bank select (referred to in the SOUNDWIRE specification as BankSelect) command to activate an audio stream and the VA (block 406). The audio source 200 checks to see if it has been voice activated (block 408) and, if not, waits for an audio hotword. Once the audio hotword is detected, the IC 202 configures the audio bus 204 by initiating a tear down of the audio stream and deactivating the VA (block 410). The IC 202 then waits for a quiet audio bus 204 (block 412). Once the audio bus 204 is quiet, the IC 202 instructs the switch 216 to switch clock sources (block 414) and configures the audio bus 204 to transmit audio (block 416). The IC 202 issues a BankSelect command to activate the audio stream and renew voice activation (block 418) using the external clock source 232.

While the process 400 allows the clock change to occur, it may result in lost audio in the time between the audio tear down 308 and audio enable 310 (i.e., blocks 410-418). For example, a user may speak an audio stream 500, illustrated in FIG. 5A, where, in this example, "OK GOOGLE" is an audio hotword 502 and "LOCK MY MAIN DOOR" is a voice command 504. However, because there are milliseconds of no audio stream, what gets passed from the audio source 200 to the IC 202 is shown as audio stream 510 in FIG. 5B, where the audio hotword 502 is received, but the voice command 504 loses a portion creating a silence gap 512 and a truncated voice command 514. In this example, an important part of the command (e.g., the action verb) is lost. Losing portions of the voice command may result in action failures or otherwise reduced user experience as the user may have to repeat the audio hotword and command or otherwise act to get a desired function. Alternatively, users may train themselves to pause after the hotword. However, such pause may inadvertently be too long causing the user to have to restart with the hotword. Even if the pause is not too long, the forced pause may degrade the user experience.

Exemplary aspects of the present disclosure allow for switching between clocks without having to tear down and rebuild the audio stream. This clock change thus allows for essentially continuous audio streaming from the audio source 200 to the IC 202. This technique is well suited for the bank switch or bank select commands found in SOUND-WIRE, but other audio systems may also benefit from the present disclosure. Likewise, while focused on incoming audio from an audio source, it should be appreciated that the present disclosure may be used with an audio sink. Using a SOUNDWIRE example, on receipt of an audio hotword, the IC transitions from the low-power or sleep mode to the active mode and prepopulates a new set of audio stream parameters in a reserve bank for the audio source, where the new parameters are based on the external clock source 232. When the external clock source 232 is ready, a bank switch command is issued, causing the audio source to use the new parameters associated with the external clock source without interrupting provision of the audio stream. Concurrently, the IC 202 switches from the internal clock to the external clock and begins sending the clock signal from the external clock over the audio bus 204.

Figure 6:
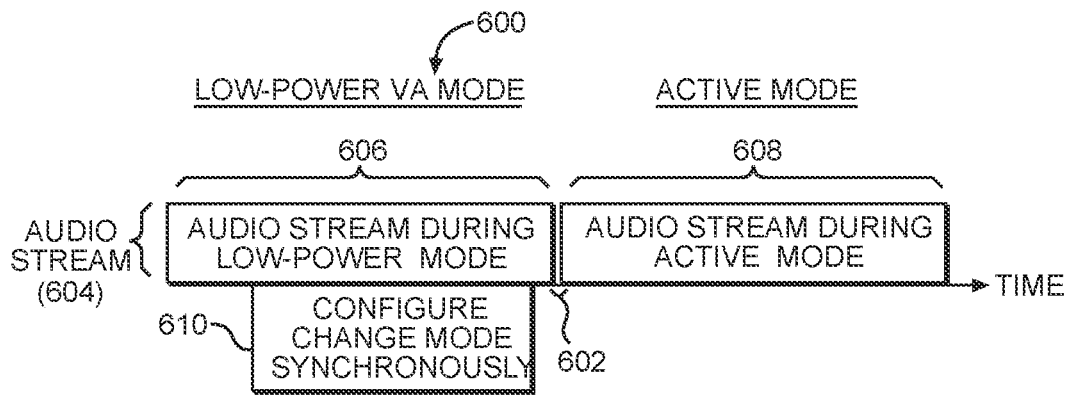
FIG. 6 illustrates an audio stream received by the IoT device as it switches from the low-power mode to the active mode using the clock-switching techniques of the present disclosure.

Thus, as illustrated in graph 600 in FIG. 6, there is essentially no gap 602 in the audio stream 604 between a low-power mode 606 and an active mode 608. To achieve this minimal gap 602, the IC 202 configures a change between clocks synchronously noted at 610 during the low-power mode 606. This synchronous change configuration allows for essentially continuous audio streaming. As used herein, "essentially continuous" means a gap of no more than one microsecond.

Figure 7:
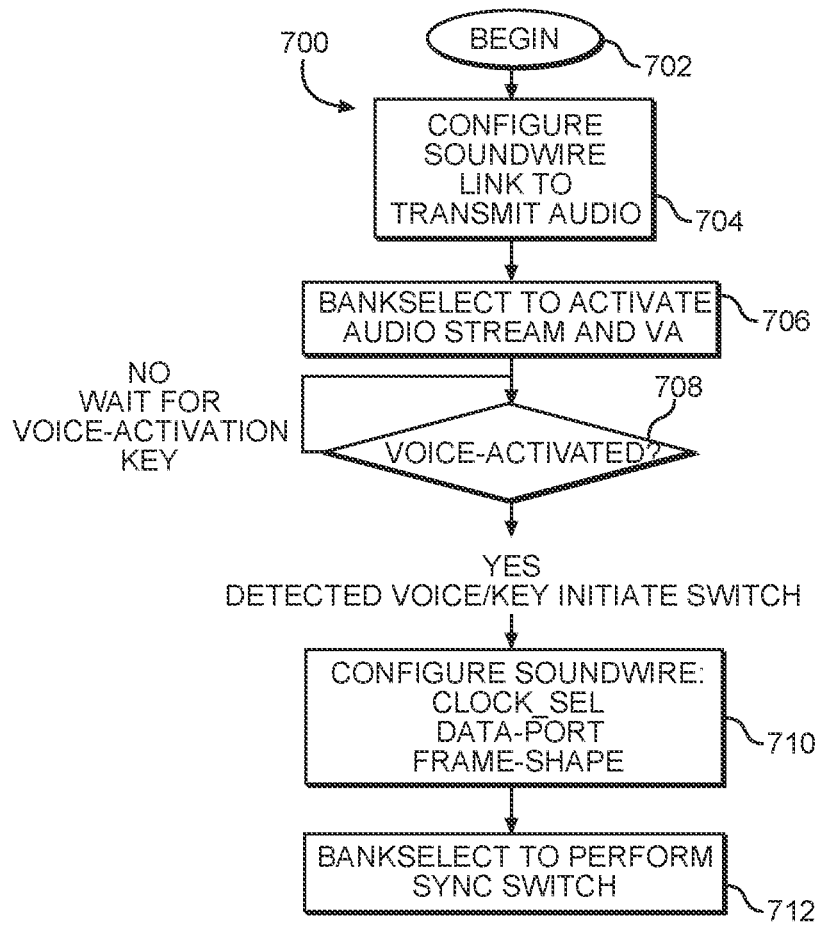
FIG. 7 is a flowchart of an exemplary process used by the IoT device as it switches clock sources using the clock-switching techniques of the present disclosure.

FIG. 7 provides a flowchart of a process 700 analogous to the process 400 of FIG. 4 but showing the synchronous clock change technique of the present disclosure. In particular, the process 700 begins (block 702). The IC 202 configures the audio bus 204 to transmit audio (block 704) such as, for example, configuring a SOUNDWIRE link. This configuration may include populating values into a register bank at the audio source or the like. The IC 202 sends and executes a bank select command to activate the audio stream and voice activation (block 706) using the internal clock source 214. The process 700 then waits for voice activation (block 708) through an audio hotword or potentially receipt of any voice input. If any voice input is used, then there is some risk of waking and/or executing a change only to discover on processing the voice input that the voice input was not directed to the IoT device. Such action may unnecessarily consume power, but may be acceptable for other design reasons. Once the activation is detected, the IC 202 begins configuring a changed audio stream by determining the new audio stream parameters for the audio stream and populating the reserve register bank in the slave device with the new audio stream parameters (block 710). Exemplary audio stream parameters include, but are not limited to, a data port, a frame shape, a stream synchronization point (SSP) count, a clock divisor factor, and a clock source select register indicating which clock source is being used. By way of example, two commands may be used. A first command may be a MCLK_MUX_SEL_VALUE command for the reserve register bank. This command may provide a one-bit field that indicates whether the internal clock source 214 is being used or the external clock source 232 is being used. A second command may be a MCLK_MUX_SEL_HALF-CLK_ADVANCED command that indicates a number of half-clock cycles of the master clock must be used to synchronize between the internal clock source 214 and the external clock source 232. If this command is three bits, then a variety of values (e.g., 0.5 to 4.0 clock cycles) may be used. The IC 202 then sends a bank switch command to perform a synchronous switch (block 712).

Figure 8:
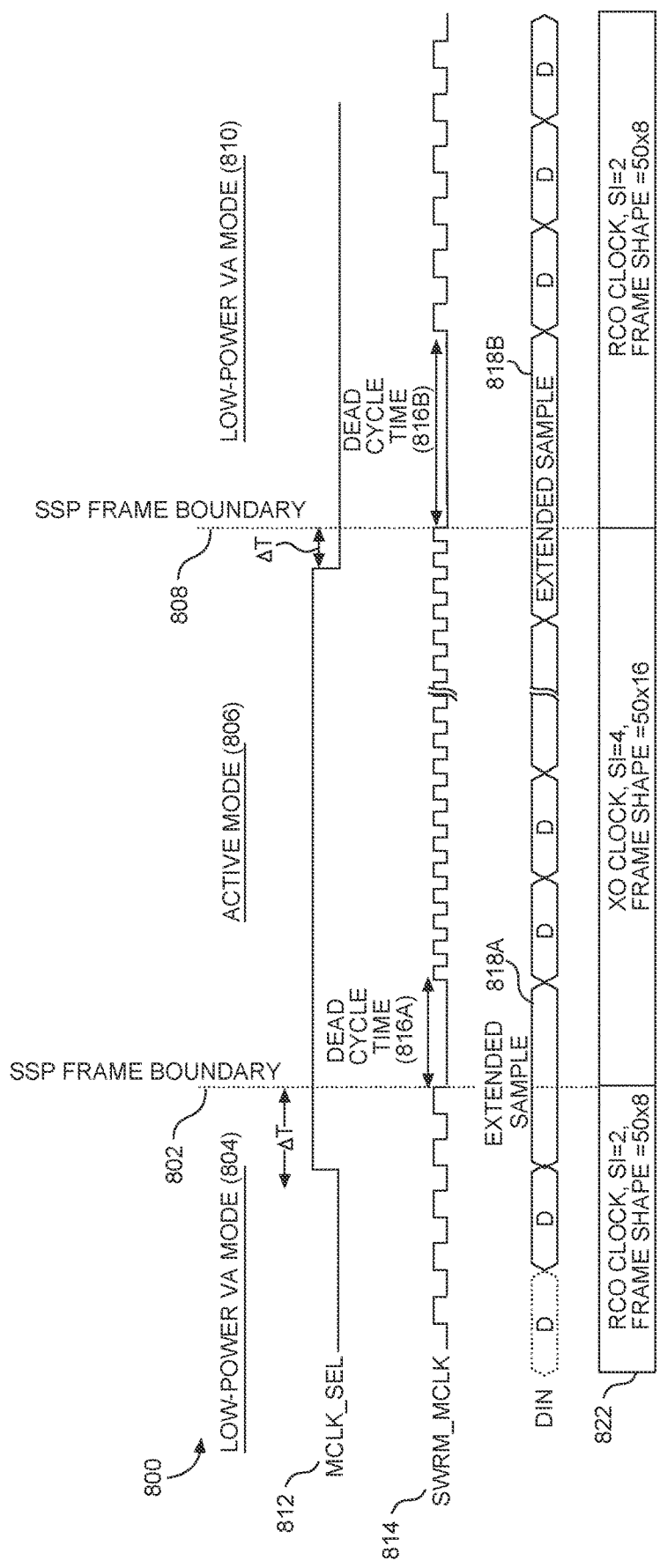
FIG. 8 is a chart of signals versus time showing the transition from the low-power mode to the active mode in the IoT device.

FIG. 8 provides a signal versus time graph 800 for various signals as the clock change occurs at an SSP 802 between a low-power mode 804 and an active mode 806 and again at a second SSP 808 between the active mode 806 and a second low-power mode 810. In particular, a signal 812 is a master clock select (mclk_sel) signal that the IC 202 uses to transition between the internal clock source 214 and the external clock source 232. In the low-power mode 804, the signal 812 is not asserted signifying use of the internal clock source 214. However, at ΔT (as determined by MCLK_MUX_SEL_HALFCLK_ADVANCED) before the SSP 802, the master clock select signal 812 is asserted. The master clock select signal 812 is deasserted again at ΔT before the second SSP 808. The value of ΔT is chosen such that it will compensate for the switching circuit propagation time, such that the assertion of the mclk_sel is done a few half-cycles before the time of the actual SSP 808. This offset will make sure that the last falling edge of the SWRM_CLK causes the SSP event to be aligned with the actual clock switch. It should be appreciated that ΔT may be different for the two events (e.g., the offset of changing from clock 1 to clock 2 is likely different than the offset of switching from clock 2 to clock 1). Signal 814 is the clock signal that is on the clock line 220. In the low-power modes 804 and 810, this is the relatively low-frequency signal from internal clock source 214. In the active mode 806, it is the relatively high-frequency signal from the external clock source 232. After transition, there may be some dead cycle time (denoted at 816A/816B), which causes a corresponding extended sample 818A/818B in the audio stream signal. These extended samples 818A/818B are small enough that the audio stream is essentially continuous with a gap of no more than 100 ns, which is sufficient to catch all the words of the command and not have the silence gap illustrated in FIG. 5B. Line 822 illustrates some example parameters (e.g., clock choice, sample interval 2 or 4, frame shape 50×8 or 50×16, and the like). It should be appreciated that these are common parameters, but others may be used without departing from the present disclosure.

It should be appreciated that the present disclosure should not negatively impact power consumption because the transition to active mode is going to take place regardless of whether the present disclosure is used or the conventional tear down and rebuilt process is used. There may be some incremental power savings in that the active mode may be used more efficiently rather than waiting for the tear down to complete before initiating a new audio stream.

Figure 9:
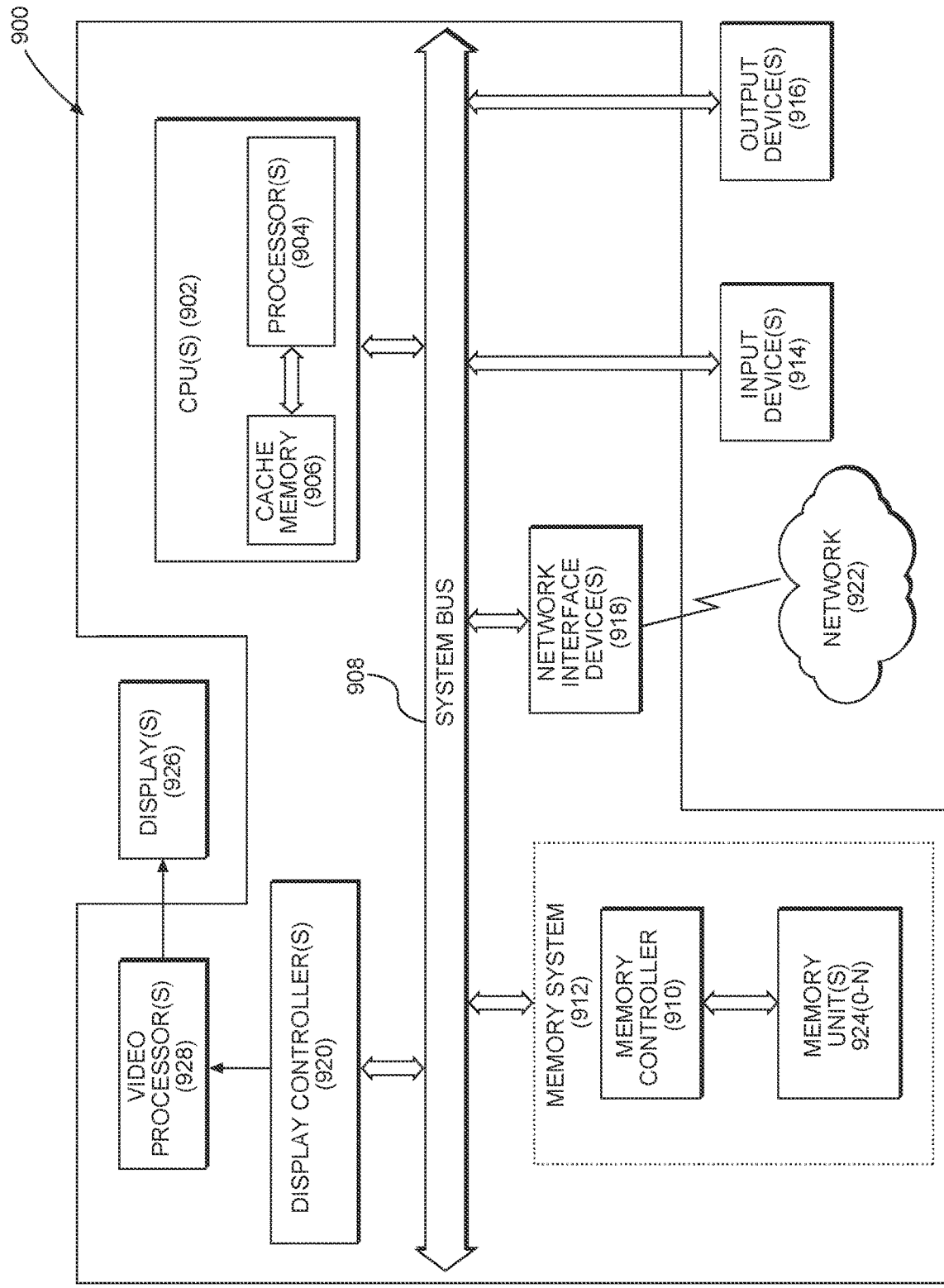
FIG. 9 is a block diagram of an exemplary processor-based system that can be the IoT device or the host device that implements the clock-switching techniques of the present disclosure.
Figure 10:
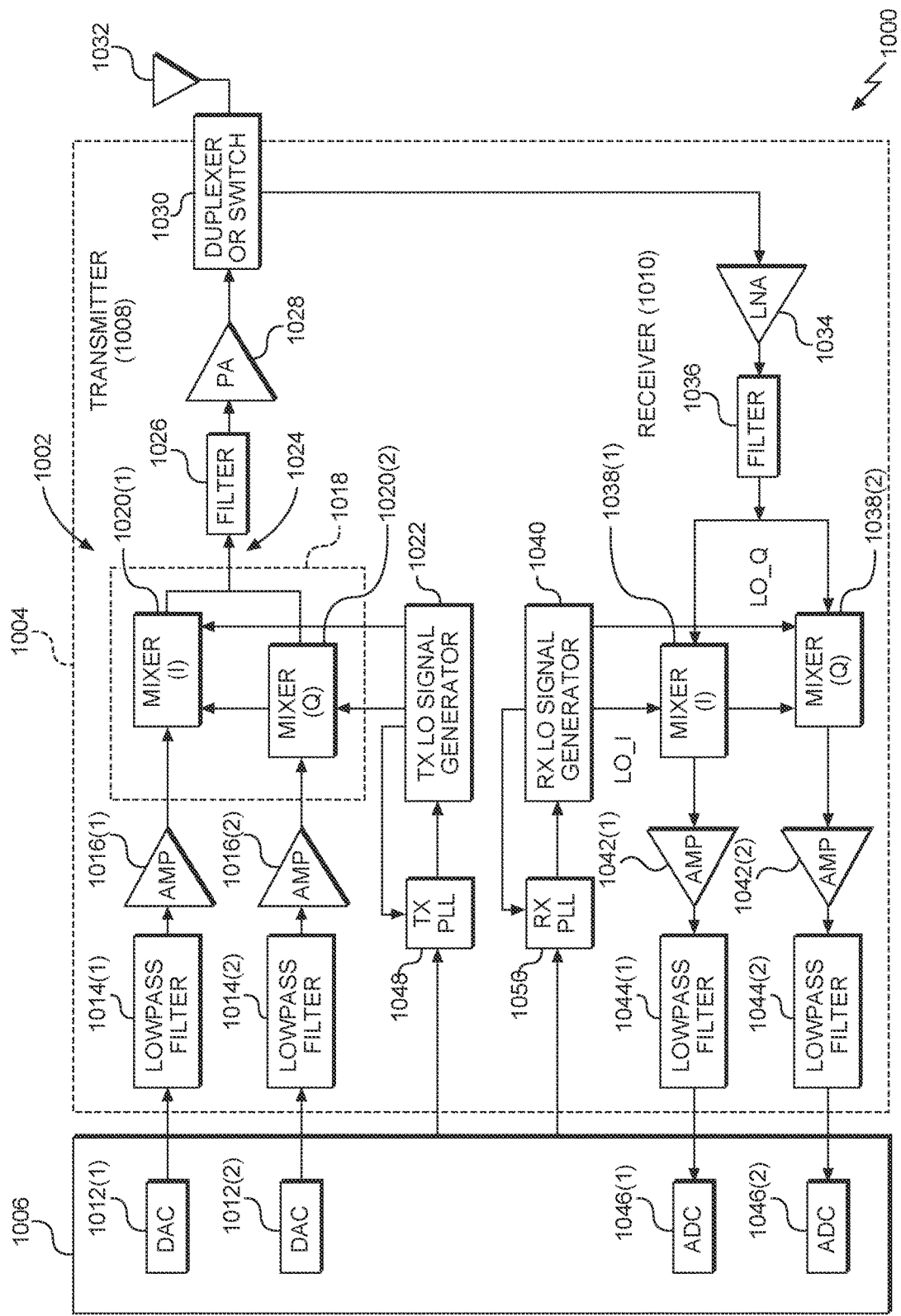
FIG. 10 is a block diagram of a wireless transceiver which may be in the IoT device or the host device that implements the clock-switching techniques of the present disclosure.

While the above discussion focuses on the portions of the present disclosure that are new, a more robust discussion of the context in which an audio bus may be found is provided in FIGS. 9 and 10. More generally, in this regard, FIG. 9 illustrates an example of a processor-based system 900 that is an IOT device 104. In this example, the processor-based system 900 includes one or more central processing units (CPUs) 902, each including one or more processors 904. The CPU(s) 902 may have cache memory 906 coupled to the processor(s) 904 for rapid access to temporarily stored data. The CPU(s) 902 is coupled to a system bus 908 and can intercouple master and slave devices included in the processor-based system 900. As is well known, the CPU(s) 902 communicates with these other devices by exchanging address, control, and data information over the system bus 908. For example, the CPU(s) 902 can communicate bus transaction requests to a memory controller 910 as an example of a slave device. Although not illustrated in FIG. 9, multiple system buses 908 could be provided, wherein each system bus 908 constitutes a different fabric.

Other master and slave devices can be connected to the system bus 908. As illustrated in FIG. 9, these devices can include a memory system 912, one or more input devices 914, one or more output devices 916, one or more network interface devices 918, and one or more display controllers 920, as examples. The input device(s) 914 can include any type of input device, including, but not limited to, input keys, switches, voice processors, etc. The output device(s) 916 can include any type of output device, including, but not limited to, audio, video, other visual indicators, etc. The network interface device(s) 918 can be any devices configured to allow exchange of data to and from a network 922. The network 922 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 918 can be configured to support any type of communications protocol desired. The memory system 912 can include one or more memory units 924(0-N).

The CPU(s) 902 may also be configured to access the display controller(s) 920 over the system bus 908 to control information sent to one or more displays 926. The display controller(s) 920 sends information to the display(s) 926 to be displayed via one or more video processors 928, which process the information to be displayed into a format suitable for the display(s) 926. The display(s) 926 can include any type of display, including, but not limited to, a cathode ray tube (CRT), a liquid crystal display (LCD), a plasma display, a light emitting diode (LED) display, etc.

FIG. 10 illustrates an example of a wireless communications device 1000 which can include a wireless transceiver. For example, the wireless transceiver can be one of the other cores of FIG. 2A or 2B or the modem in the host 230. The wireless communications device 1000 may include or be provided in any of the above-referenced devices, as examples. As shown in FIG. 10, the wireless communications device 1000 includes a transceiver 1004 and a data processor 1006. The data processor 1006 may include a memory (not shown) to store data and program codes. The transceiver 1004 includes a transmitter 1008 and a receiver 1010 that support bi-directional communication. In general, the wireless communications device 1000 may include any number of transmitters and/or receivers for any number of communication systems and frequency bands. All or a portion of the transceiver 1004 may be implemented on one or more analog ICs, RF ICs (RFICs), mixed-signal ICs, etc.

A transmitter 1008 or a receiver 1010 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage. In the direct-conversion architecture, a signal is frequency converted between RF and baseband in one stage. The super-heterodyne and direct-conversion architectures may use different circuit blocks and/or have different requirements. In the wireless communications device 1000 in FIG. 10, the transmitter 1008 and the receiver 1010 are implemented with the direct-conversion architecture.

In the transmit path, the data processor 1006 processes data to be transmitted and provides I and Q analog output signals to the transmitter 1008. In the exemplary wireless communications device 1000, the data processor 1006 includes digital-to-analog-converters (DACs) 1012(1) and 1012(2) for converting digital signals generated by the data processor 1006 into the I and Q analog output signals, e.g., I and Q output currents, for further processing.

Within the transmitter 1008, lowpass filters 1014(1), 1014(2) filter the I and Q analog output signals, respectively, to remove undesired images caused by the prior digital-to-analog conversion. Amplifiers (AMPs) 1016(1), 1016(2) amplify the signals from the lowpass filters 1014(1), 1014(2), respectively, and provide I and Q baseband signals. An upconverter 1018 upconverts the I and Q baseband signals with I and Q transmit (TX) local oscillator (LO) signals from a TX LO signal generator 1022 through mixers 1020(1), 1020(2) to provide an upconverted signal 1024. A filter 1026 filters the upconverted signal 1024 to remove undesired images caused by the frequency upconversion as well as noise in a receive frequency band. A power amplifier (PA) 1028 amplifies the upconverted signal 1024 from the filter 1026 to obtain the desired output power level and provides a transmit RF signal. The transmit RF signal is routed through a duplexer or switch 1030 and transmitted via an antenna 1032.

In the receive path, the antenna 1032 receives signals transmitted by base stations and provides a received RF signal, which is routed through the duplexer or switch 10320 and provided to a low noise amplifier (LNA) 1034. The duplexer or switch 1030 is designed to operate with a specific RX-to-TX duplexer frequency separation, such that RX signals are isolated from TX signals. The received RF signal is amplified by the LNA 1034 and filtered by a filter 1036 to obtain a desired RF input signal. Downconversion mixers 1038(1), 1038(2) mix an output of the filter 1036 with I and Q receive (RX) LO signals (i.e., LO_I and LO_Q) from an RX LO signal generator 1040 to generate I and Q baseband signals. The I and Q baseband signals are amplified by AMPs 1042(1), 1042(2) and further filtered by lowpass filters 1044(1), 1044(2) to obtain I and Q analog input signals, which are provided to the data processor 1006. In this example, the data processor 1006 includes ADCs 1046(1), 1046(2) for converting the analog input signals into digital signals to be further processed by the data processor 1006.

In the wireless communications device 1000 in FIG. 10, the TX LO signal generator 1022 generates the I and Q TX LO signals used for frequency upconversion, while the RX LO signal generator 1040 generates the I and Q RX LO signals used for frequency downconversion. Each LO signal is a periodic signal with a particular fundamental frequency. A transmit (TX) phase-locked loop (PLL) circuit 1048 receives timing information from data processor 1006 and generates a control signal used to adjust the frequency and/or phase of the TX LO signals from the TX LO signal generator 1022. Similarly, a receive (RX) phase-locked loop (PLL) circuit 1050 receives timing information from the data processor 1006 and generates a control signal used to adjust the frequency and/or phase of the RX LO signals from the RX LO signal generator 1040.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered aspects:

1. An integrated circuit (IC) comprising:
   a first clock source;
   a clock input coupled to a second clock source;
   a switch coupled to the first clock source and the clock input; and
   an audio master core comprising:
   an audio bus interface coupled to an audio bus; and
   a control circuit coupled to the audio bus interface and configured to:
   while in a sleep mode:
   instruct the switch to select the first clock source to use on the audio bus for an audio stream;

receive a command to exit the sleep mode; and
populate a reserve bank in a slave device with new audio stream parameters;
exit the sleep mode; and
instruct the slave device to switch to the reserve bank without interrupting the audio stream.

2. The IC of aspect 1, wherein the audio bus interface comprises a SOUNDWIRE audio bus interface.

3. The IC of aspects 1 or 2, wherein the first clock source comprises a ring oscillator.

4. The IC of any previous aspect, wherein the first clock source is configured to provide a 4.8 megahertz (MHz) clock signal.

5. The IC of any previous aspect, wherein a second clock signal received at the clock input from the second clock source is a 9.6 megahertz (MHz) clock signal.

6. The IC of any of the aspects 1 to 4, wherein a second clock signal received at the clock input from the second clock source is a 19.2 megahertz (MHz) clock signal.

7. The IC of any previous aspect, further comprising an always on (AO) circuit coupled to the control circuit, wherein the AO circuit is configured to receive the command.

8. The IC of any previous aspect, wherein the audio bus comprises a two-wire audio bus.

9. The IC of any previous aspect, wherein the switch comprises a multiplexer.

10. The IC of any previous aspect, further comprising an application processor core.

11. The IC of any previous aspect, further comprising a BLUETOOTH core.

12. The IC of any previous aspect, further comprising a WIFI core.

13. The IC of any previous aspect, wherein the command to exit the sleep mode comprises an audio hotword received from an audio source across the audio bus.

14. The IC of aspect 13, wherein the audio hotword is received in the audio stream.

15. The IC of any previous aspect, wherein the control system is further configured to form initial parameters for the audio stream for use in the sleep mode.

16. The IC of any previous aspect, wherein one of the new audio stream parameters comprises a data port parameter.

17. The IC of any previous aspect, wherein one of the new audio stream parameters comprises a frame shape.

18. The IC of any previous aspect, wherein one of the new audio stream parameters comprises a clock divider instruction.

19. The IC of any previous aspect, wherein one of the new audio stream parameters comprises a stream synchronization point (SSP) count.

20. The IC of any previous aspect, wherein one of the new audio stream parameters comprises a clock source select register.

21. The IC of any previous aspect, wherein the audio stream has a data rate of 600 kilohertz (kHz).

22. The IC of any previous aspect, wherein the control circuit is configured to issue a clock advance command to synchronize the first clock source to the second clock source on the audio bus.

23. The IC of any of aspects 1 to 12 or 15 to 22, wherein the command to exit the sleep mode comprises detecting an audible input at an audio source associated with the audio bus.

24. The IC of any previous aspect integrated into an Internet of Things (IoT) device.

25. The IC of any of the aspects 1 to 23 integrated into a wearable device.

26. An Internet of Things (IoT) device comprising:
an audio source comprising a microphone;
an audio bus coupled to the microphone; and
an integrated circuit (IC) comprising:
a first clock source;
a clock input coupled to a second clock source;
a switch coupled to the first clock source and the clock input; and
an audio master core comprising:
an audio bus interface coupled to the audio bus; and
a control circuit coupled to the audio bus interface and configured to:
while in a sleep mode:
instruct the switch to select the first clock source to use on the audio bus for an audio stream;
receive an audio hotword command from the audio source to exit the sleep mode; and
populate a reserve bank in the audio source with new audio stream parameters;
exit the sleep mode; and
instruct the audio source to switch to the reserve bank without interrupting the audio stream.

What is claimed is:

1. An integrated circuit (IC) comprising:
a first clock source;
a clock input coupled to a second clock source;
a switch coupled to the first clock source and the clock input; and
an audio master core comprising:
an audio bus interface coupled to an audio bus; and
a control circuit coupled to the audio bus interface and configured to:
while in a sleep mode:
instruct the switch to select the first clock source to use on the audio bus for an audio stream;
receive a command to exit the sleep mode; and
populate a reserve bank in a slave device with new audio stream parameters;
exit the sleep mode; and
instruct the slave device to switch to the reserve bank without interrupting the audio stream.

2. The IC of claim 1, wherein the audio bus interface comprises a SOUNDWIRE audio bus interface.

3. The IC of claim 1, wherein the first clock source comprises a ring oscillator.

4. The IC of claim 1, wherein the first clock source is configured to provide a 4.8 megahertz (MHz) clock signal.

5. The IC of claim 1, wherein a second clock signal received at the clock input from the second clock source is a 9.6 megahertz (MHz) clock signal.

6. The IC of claim 1, wherein a second clock signal received at the clock input from the second clock source is a 19.2 megahertz (MHz) clock signal.

7. The IC of claim 1, further comprising an always on (AO) circuit coupled to the control circuit, wherein the AO circuit is configured to receive the command.

8. The IC of claim 1, wherein the audio bus comprises a two-wire audio bus.

9. The IC of claim 1, wherein the switch comprises a multiplexer.

10. The IC of claim 1, further comprising an application processor core.

11. The IC of claim 1, further comprising a BLUETOOTH core.

12. The IC of claim 1, further comprising a WIFI core.

13. The IC of claim 1, wherein the command to exit the sleep mode comprises an audio hotword received from an audio source across the audio bus.

14. The IC of claim 13, wherein the audio hotword is received in the audio stream.

15. The IC of claim 1, wherein the control system is further configured to form initial parameters for the audio stream for use in the sleep mode.

16. The IC of claim 1, wherein one of the new audio stream parameters comprises a data port parameter.

17. The IC of claim 1, wherein one of the new audio stream parameters comprises a frame shape.

18. The IC of claim 1, wherein one of the new audio stream parameters comprises a clock divider instruction.

19. The IC of claim 1, wherein one of the new audio stream parameters comprises a stream synchronization point (SSP) count.

20. The IC of claim 1, wherein one of the new audio stream parameters comprises a clock source select register.

21. The IC of claim 1, wherein the audio stream has a data rate of 600 kilohertz (kHz).

22. The IC of claim 1, wherein the control circuit is configured to issue a clock advance command to synchronize the first clock source to the second clock source on the audio bus.

23. The IC of claim 1, wherein the command to exit the sleep mode comprises detecting an audible input at an audio source associated with the audio bus.

24. The IC of claim 1 integrated into an Internet of Things (IoT) device.

25. The IC of claim 1 integrated into a wearable device.

26. An Internet of Things (IoT) device comprising:
an audio source comprising a microphone;
an audio bus coupled to the microphone; and
an integrated circuit (IC) comprising:
  a first clock source;
  a clock input coupled to a second clock source;
  a switch coupled to the first clock source and the clock input; and
  an audio master core comprising:
    an audio bus interface coupled to the audio bus; and
    a control circuit coupled to the audio bus interface and configured to:
      while in a sleep mode:
        instruct the switch to select the first clock source to use on the audio bus for an audio stream;
        receive an audio hotword command from the audio source to exit the sleep mode; and
        populate a reserve bank in the audio source with new audio stream parameters;
      exit the sleep mode; and
      instruct the audio source to switch to the reserve bank without interrupting the audio stream.

* * * * *